(12) United States Patent
Yoshida et al.

(10) Patent No.: US 6,660,420 B1
(45) Date of Patent: Dec. 9, 2003

(54) SEPARATOR FOR A FUEL CELL AND A METHOD OF PRODUCING THE SAME

(75) Inventors: Tsunemori Yoshida, Sanda (JP); Katsunori Sugita, Sanda (JP); Terumasa Yamamoto, Sanda (JP); Masahito Kaji, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 09/660,291

(22) Filed: Sep. 12, 2000

(30) Foreign Application Priority Data

Jun. 19, 2000 (JP) ........................................ 2000-183236

(51) Int. Cl.$^7$ ................................................. H01M 2/00
(52) U.S. Cl. .............................. 429/34; 429/41; 429/253
(58) Field of Search ............................ 429/34, 41, 253

(56) References Cited

U.S. PATENT DOCUMENTS

| 4,737,421 A | * | 4/1988 | Uemura et al. ............. 429/34 |
| 6,180,275 B1 | * | 1/2001 | Braun et al. ................ 429/34 |
| 6,242,124 B1 | * | 6/2001 | Saito et al. ................. 429/38 |

* cited by examiner

*Primary Examiner*—Laura Weiner
(74) *Attorney, Agent, or Firm*—Jones, Tullar & Cooper, P.C.

(57) ABSTRACT

In a separator for a fuel cell and a method of producing a separator for a fuel cell according to the invention, bond-carbon is used in which composition ratios are set to 60 to 90 wt. % (preferably, 70 to 87 wt. %) of graphite powder having an average diameter in a range of 15 to 125 μm (preferably, 40 to 100 μm), and 10 to 40 wt. % (preferably, 13 to 30 wt. %) of a thermosetting resin. The compound is previously cold-molded into a shape similar to a final molded shape. The preliminary molded member is then placed in a mold, and then molded into a separator of the final shape by applying a pressure of a range of 10 to 100 MPa. The surface roughness Ra of at least a portion of the separator contacting with an electrode is set to a range of 0.1 to 0.5 μm. According to this configuration, fluidity and moldability are excellent, the contact resistance can be set to a value lower than a requested value while ensuring strength sufficient for preventing the separator from suffering a damage such as a breakage due to vibrations or the like, and the low contact resistance can be stably maintained.

6 Claims, 6 Drawing Sheets

SEPARATOR FOR A FUEL CELL AND A METHOD OF PRODUCING THE SAME

BACKGROUND OF THE INVENTION

1. Field of the Invention

The present invention relates to a separator for a fuel cell which is mainly used as a cell for an electric vehicle, and also to a method of producing the separator, and more particularly to a separator for a fuel cell of the electrolyte type or the phosphoric acid type, and also to a method of producing the separator. In a fuel cell of such a type, a unit cell which is a unit constituting the cell is configured by: sandwiching a gas diffusion electrode having a sandwich structure wherein an electrolyte membrane is configured by an ion exchange membrane, between an anode and a cathode; sandwiching the gas diffusion electrode between separators; and forming fuel gas passages and oxidant gas passages between the separators, and the anode and the cathode.

2. Description of the Prior Art

In a fuel cell, a fuel gas containing hydrogen is supplied to an anode, and an oxidant gas containing oxygen is supplied to a cathode, so that, in the anode and the cathode, electrochemical reactions indicated by the formulae:

$$H_2 \rightarrow 2H^+ + 2e^- \tag{1}$$

$$(\tfrac{1}{2})O_2 + 2H^+ + 2e^- \rightarrow H_2O \tag{2}$$

occur, and, in the whole of the cell, an electrochemical reaction indicated by the formula:

$$H_2 + (\tfrac{1}{2})O_2 \rightarrow H_2O \tag{3}$$

proceeds. The chemical energy of the fuel is directly converted into electrical energy, with the result that the cell can exert a predetermined performance.

A separator for a fuel cell of the electrolyte type or the phosphoric acid type in which such energy conversion is conducted is desirably gas-impermeable, and also is made of an electrically conductive material. Conventionally, it is known that, as a material meeting the requirements, an electrically conductive resin is used. An electrically conductive resin is a complex which is configured by bonding graphite (carbon) powder by means of a thermosetting resin such as phenol resin, or a so-called bondcarbon (resin-bonded carbon) compound. A separator for a fuel cell is configured by forming such a bondcarbon compound into a predetermined shape.

Conventionally, a separator for a fuel cell having a predetermined shape is formed by using such a bondcarbon compound in the following manner. With respect to the composition ratio of a thermosetting resin such as phenol resin and graphite powder, 25 to 60 wt. % of the thermosetting resin is used as an adequate content in consideration of fluidity, moldability, and gas-impermeability of the bondcarbon compound, and in order to ensure the strength (compression and bending) sufficient for preventing the separator from suffering damage such as a breakage due to vibrations or the like which may be produced during a handling operation in an assembling step of a unit cell of a fuel cell, or a use in an automobile.

In a conventional separator for a fuel cell which is configured by using a bondcarbon compound of such composition ratios, the content of a thermosetting resin serving as an electrically insulating material is large, and hence the conductivity of the separator itself is lowered so that the electrical resistance is increased. This is not preferable from the viewpoint of the performance of a fuel cell.

In order to improve the conductivity of a separator for a fuel cell s configured by using a bondcarbon compound, it has been contemplated that the content of a thermosetting resin be reduced as far as possible. When the content of a thermosetting resin is reduced, however, elongation and fluidity of the bondcarbon compound during a molding process are lowered to impair moldability, and the strength is low. When the resin content is 10 wt. % or less, particularly the strength of a separator becomes insufficient, and therefor the separator easily suffers damage such as a breakage or a crack due to vibrations or the like which are continuously applied to the separator in the case where the separator is used in an automobile.

By contrast, in the case where the resin content is set to the above-mentioned adequate range (25 to 60 wt. %), elongation and fluidity of a bondcarbon compound are excellent and moldability is higher, and strength sufficient for preventing a separator from suffering damage such as a breakage or a crack due to vibrations or the like can be ensured. However, the contact resistance with respect to an electrode and serving as the primary factor which largely affects the performance of a fuel cell becomes higher, as the resin content is larger. When the resin content is larger than 40 wt. %, particularly, the contact resistance is suddenly increased, and the performance of the fuel cell is extremely lowered.

The contact resistance serving as the primary factor which largely affects the performance of a fuel cell will be considered. Even when a fuel cell is used in an automobile in which vibrations are always applied to the fuel cell, it is desirable that the contact resistance be stably maintained to 10 m$\Omega\cdot$cm$^2$ or lower. When the contact resistance is to be stably maintained to such a requested value, a countermeasure in which only the composition ratios of a thermosetting resin and graphite powder are considered cannot satisfy both the requirements on fluidity and moldability of a compound and the strength of a molded member (separator), and the contact resistance, as described above. Development of a separator for a fuel cell which is excellent in moldability and strength, and which can be stably maintained to a low contact resistance of 10 m$\Omega\cdot$cm$^2$ or lower is strongly requested. At present, however, there exists no separator which can satisfy the noted desirability.

SUMMARY OF THE INVENTION

The present invention has been conducted in order to satisfy the noted desirability. It is an object of the invention to provide a separator for a fuel cell which is excellent in fluidity and moldability, and in which, while ensuring strength sufficient for preventing the separator from suffering damage such as a breakage due to vibrations or the like, the contact resistance can be set to a value lower than a requested value, and the low contact resistance can be stably maintained.

It is another object of the invention to provide a method of producing a separator for a fuel cell wherein, even when a molding material of low fluidity is used, a separator which has a uniform and correct shape, and in which a low contact resistance can be stably maintained can be surely produced.

In order to attain the objects, the separator for a fuel cell of the invention is a separator for a fuel cell consisting of a complex which is configured by bonding graphite powder by means of a thermosetting resin, and characterized in that, in the complex, a composition ratio of the graphite powder is set to 60 to 90 wt. %, a composition ratio of the thermosetting resin is set to 10 to 40 wt. %, and an average particle diameter of the graphite powder is set to a range of 15 to 125 µm.

In the complex, preferably, the composition ratio of the graphite powder is set to 70 to 87 wt. %, and the composition ratio of the thermosetting resin is set to 13 to 30 wt. %. Preferably, the average particle diameter of the graphite powder is set to a range of 40 to 100 µm.

In order to meet the above-mentioned demands for development, intensive studies on a separator for a fuel cell which is configured by using a bondcarbon compound have been conducted, and finally found that the contact resistance serving as the primary factor which largely affects the performance of a fuel cell is determined not only by the composition ratios of a resin and graphite powder, the average diameter of the graphite powder closely affects the performance at the highest degree, the contact resistance is largely varied depending on the size of the average diameter, and the average diameter of the graphite powder is closely related also to fluidity, moldability, and strength of the compound. Based on this finding, the composition ratios of a resin and graphite powder, and the average diameter of the graphite powder have been respectively set to the above-mentioned ranges, thereby completing the invention.

According to the thus configured invention, as the graphite powder which is the one composition of the complex and which affects the contact resistance at the highest degree, graphite powder in which the average diameter is set to a range of 15 to 125 µm, preferably, 40 to 100 µm is used, the composition ratio of the thermosetting resin which is the other composition of the complex, and which largely affects fluidity, moldability and strength is set to a range of 10 to 40 wt. %, preferably, 13 to 30 wt. %, thereby attaining an effect that, while the complex serving as a molding material has excellent elongation and fluidity and exerts high moldability, and strength sufficient for preventing the separator from suffering damage such as a breakage or a crack due to vibrations or the like can be ensured, the contact resistance with respect to an electrode can be set to a low value of 10 mΩ·cm² or lower which is required in a separator for a fuel cell, and the low contact resistance can be stably maintained so that the performance of a fuel cell can be remarkably improved.

In the case where the average particle diameter of graphite powder is smaller than the above-mentioned range, or, for example, 10 µm or smaller, the contact resistance is higher or 15 mΩ·cm² or more, even when the resin content is adjusted to any value. Namely, the obtained contact resistance is very different from the value (10 mΩ·cm² or lower) which is required in a fuel cell to be used under conditions where vibrations are applied, such as the case of mounting on an automobile. In the case where the resin content is smaller than 10 wt. %, and also in the case where the average diameter of graphite powder is, for example, 150 µm or more, i.e., exceeds the above-mentioned range, fluidity and moldability are improved, but a large number of breakages, minute cracks, and the like are produced by vibrations in edges of projections serving as contact faces with respect to an electrode. Even when a low contact resistance is obtained in an early stage of use, the contact resistance is suddenly increased after use of a short time, so that a low contact resistance meeting the above-mentioned demands cannot be maintained. This will be described later in detail.

In the separator for a fuel cell of the invention, when a surface roughness of a portion contacting an electrode is set to a range of Ra=0.1 to 0.5 µm as measured by a surface roughness meter having a probe of a diameter of 5 µm, the contact resistance can be further lowered, so that further improvement of the performance of a cell can be attained.

The method of producing a separator for a fuel cell according to the invention is a method of producing a separator for a fuel cell configured by molding a complex in which composition ratios are set to 60 to 90 wt. % of graphite powder, and 10 to 40 wt. % of a thermosetting resin, and an average diameter of the graphite powder is set to a range of 15 to 125 µm, and characterized in that the complex is previously coldmolded into a shape similar to a final molded shape by a pressure of a range of 2 to 10 MPa, the preliminary molded member is then placed in a mold, and the preliminary molded member is molded into the final shape by applying a pressure of a range of 10 to 100 MPa.

Preferably, in the complex, the composition ratio of the graphite powder is set to 70 to 87 wt. %, the composition ratio of the thermosetting resin is set to 13 to 30 wt. %, and the average particle diameter of the graphite powder is set to a range of 40 to 100 µm.

The shape similar to a final molded shape means that the dimensions other than those in the direction of the molding pressure are similar to corresponding ones of the final molded member. Preferably, dimensions of the preliminary molded member in the direction of the molding pressure are set to be about 1.0 to about 2.0 times dimensions of the final molded member. When such a preliminary molded member is used, the mold density and the volume resistivity can be further improved.

According to the production method of the invention having the above-described molding means, the two-step molding is employed wherein a complex (bondcarbon compound) is previously cold-molded into a shape similar to the final molded shape by a pressure of a range of 2 to 10 MPa, and the preliminary molded member is placed in a mold and then molded into the final shape by applying a high molding pressure of a range of 10 to 100 MPa. Even when a complex (molding material) which is low in elongation and fluidity is used, therefore, the compound can surely extend to every corner of the mold so that, while suppressing molding unevenness, the mold density is increased and the complex can be charged more uniformly. As a result, it is possible to surely and easily obtain a uniform separator which exhibits low contact resistance and has good conductivity, and which is uniform and is correct also in shape.

As the thermosetting resin which is useful in the invention, phenol resin which is excellent in wettability with respect to graphite powder may be most preferably used. Alternatively, any other resin such as polycarbodiimide resin, epoxy resin, furfuryl alcohol resin, urea resin, melamine resin, unsaturated polyester resin, or alkyd resin may be used as far as the resin causes a thermosetting reaction when the resin is heated, and is stable against the operating temperature of the fuel cell and components of the supplied gasses.

As the graphite powder which is useful in the invention, powder of graphite of any kind, including natural graphite, artificial graphite, carbon black, kish graphite, and expanded graphite may be used. In consideration of conditions such as cost, the kind of graphite can be arbitrarily selected. In the case where expanded graphite is used, particularly, a layer structure is formed by expanding the volume of the graphite as a result of heating. When molding pressure is applied, layers can twine together to be firmly bonded to one another.

Therefore, expanded graphite is effective in a complex in which the ratio of a thermosetting resin is to be reduced.

Other objects and effects of the invention will be clarified in embodiments which will be described below.

PREFERRED EMBODIMENTS OF THE INVENTION

Hereinafter, embodiments of the invention will be described with reference to the accompanying drawings.

Figure 1:
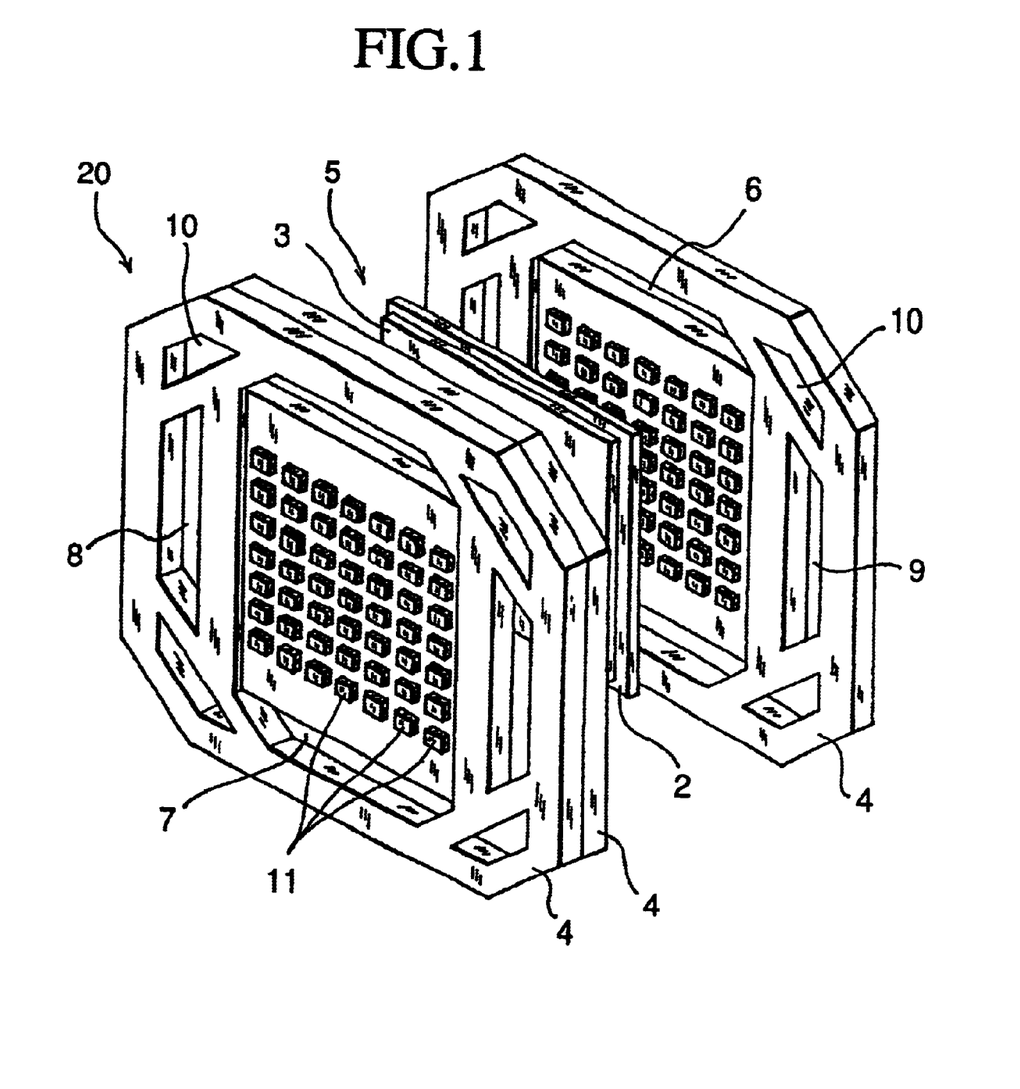
FIG. 1 is an exploded perspective view showing the configuration of a stack structure constituting a solid polymer electrolyte type fuel cell which has the separator of the invention.

First, the configuration and the operation of a solid polymer electrolyte type fuel cell having the separator of the invention will be briefly described with reference to FIGS. 1 to 3.

The solid polymer electrolyte type fuel cell 20 has a stack structure in which plural unit cells 5 are stacked and collector plates (not shown) are respectively placed on both ends. Each of the unit cells 5 is configured by: an electrolyte membrane 1 which is an ion exchange membrane made of, for example, a fluororesin; an anode 2 and a cathode 3 which are formed by carbon cloth woven of carbon filaments, carbon paper, or carbon felt, and which sandwich the electrolyte membrane 1 to constitute a gas diffusion electrode having a sandwich structure; and separators 4 which sandwich the sandwich structure.

Figure 2:
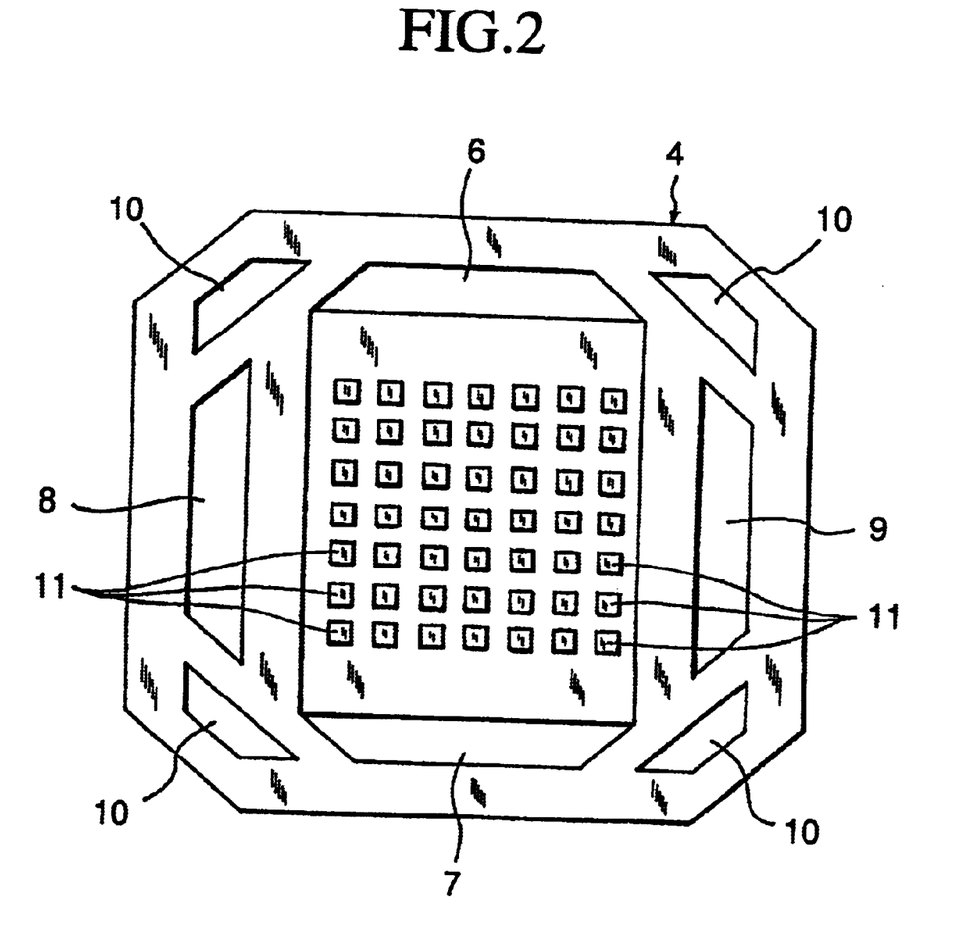
FIG. 2 is an external front view of the separator in the solid polymer electrolyte type fuel cell.

In each of the separators 4, as shown in FIG. 2, fuel gas holes 6 and 7 for a fuel gas containing hydrogen, oxidant gas holes 8 and 9 for an oxidant gas containing oxygen, and a coolant water hole 10 are formed in the peripheral area. When plural unit cells 5 are stacked, the holes 6, 7, 8, 9, and 10 of the separators 4 of the unit cells constitute holes passing through the fuel cell 20 in the longitudinal direction to form a fuel gas supply manifold, a fuel gas discharge manifold, an oxidant gas supply manifold, an oxidant gas discharge manifold, and a coolant water passage, respectively.

Figure 3:
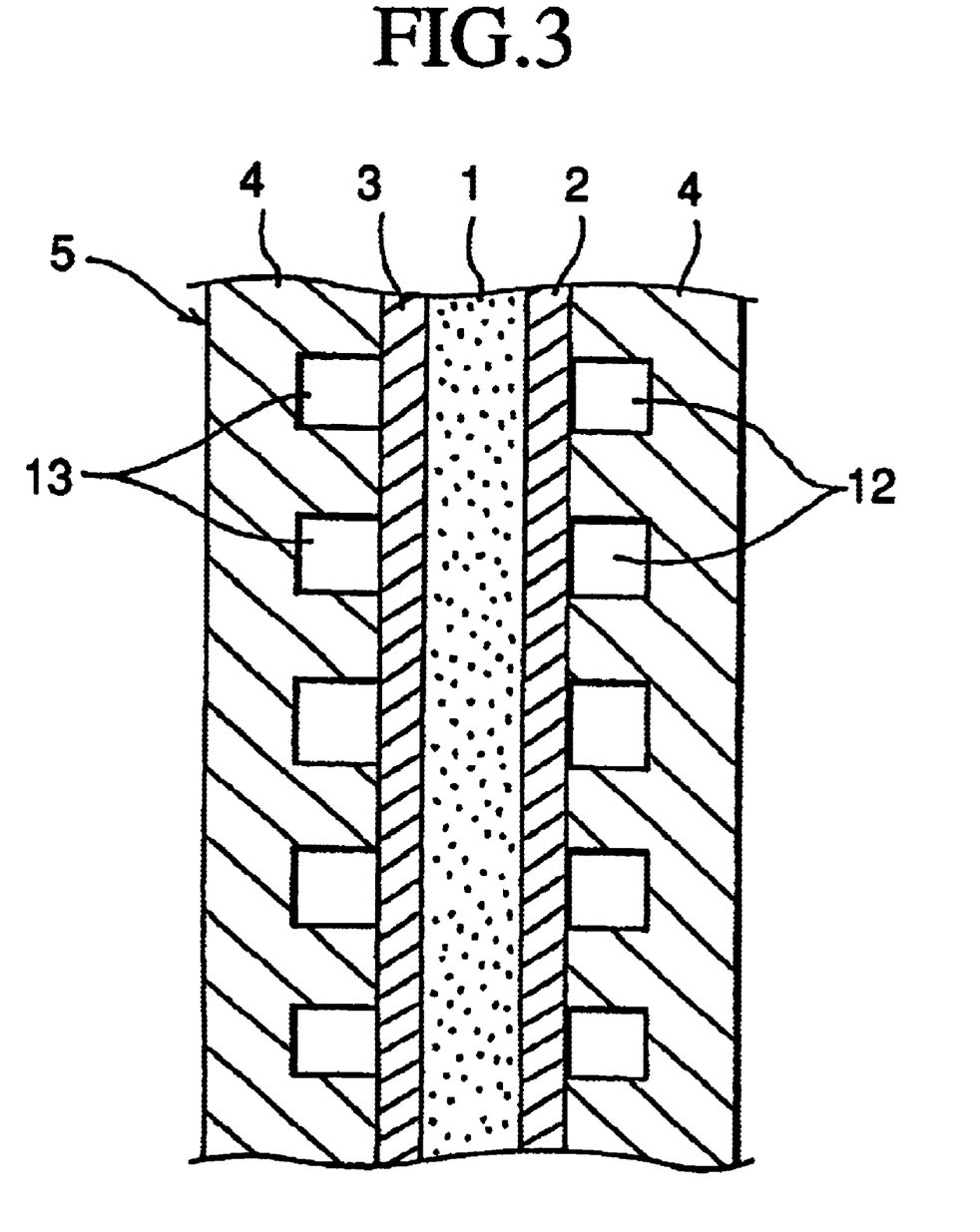
FIG. 3 is an enlarged section view of main portions and showing the configuration of a unit cell which is a unit constituting the solid polymer electrolyte type fuel cell.

As shown in FIG. 3, a large number of ribs 11 having a predetermined shape are protrudingly formed on the surfaces of the separators 4 which sandwich the electrolyte membrane 1, the anode 2, and the cathode 3. Fuel gas passages 12 are formed between the ribs 11 of one of the separators 4 and the surface of the anode 2. Oxidant gas passages 13 are formed between the ribs 11 of the other separator 4 and the surface of the cathode 3.

In the solid polymer electrolyte type fuel cell 20 configured as a stack structure in which plural unit cells 5 are stacked and the collector plates are respectively placed on both the ends, the fuel gas which is supplied from an external fuel gas supplying device to the fuel cell 20, and which contains hydrogen is then supplied into the fuel gas passages 12 of each unit cell 5 via the fuel gas supply manifold to cause the electrochemical reaction indicated by formula (1) above, on the side of the anode 2 of the unit cell 5. After the reaction, the fuel gas is discharged to the outside via the fuel gas passages 12 of the unit cell 5 and the fuel gas discharge manifold. At the same time, the oxidant gas (air) which is supplied from an external oxidant gas supplying device to the fuel cell 20, and which contains oxygen is then supplied into the oxidant gas passages 13 of each unit cell 5 via the oxidant gas supply manifold to cause the electrochemical reaction indicated by formula (2) above, on the side of the cathode 3 of the unit cell 5. After the reaction, the oxidant gas is discharged to the outside via the oxidant gas passages 13 of the unit cell 5 and the oxidant gas discharge manifold.

In accordance with the electrochemical reactions of formulae (1) and (2) above, in the whole of the fuel cell 20, the electrochemical reaction indicated by the formula (3) proceeds, so that the chemical energy of the fuel is directly converted into electrical energy, with the result that the cell can exert predetermined performance. Because of the characteristics of the electrolyte membrane 1, the fuel cell 20 is operated in a temperature range of about 80 to 100° C., and hence involves heat generation. During operation of the fuel cell 20, therefore, coolant water is supplied from an external coolant water supplying device to the fuel cell 20, and the coolant water is circulated through the coolant water passage, thereby preventing the temperature of the interior of the fuel cell 20 from being raised.

Figure 4A:
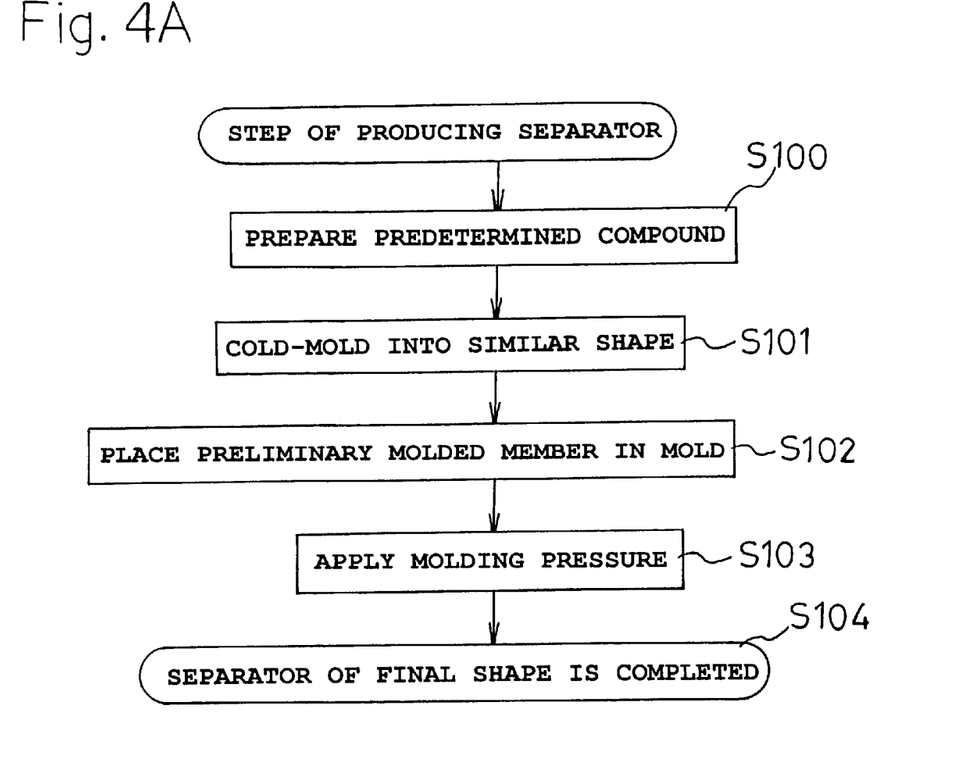
FIG. 4A is a view illustrating a step of producing the separator.
Figure 4B:
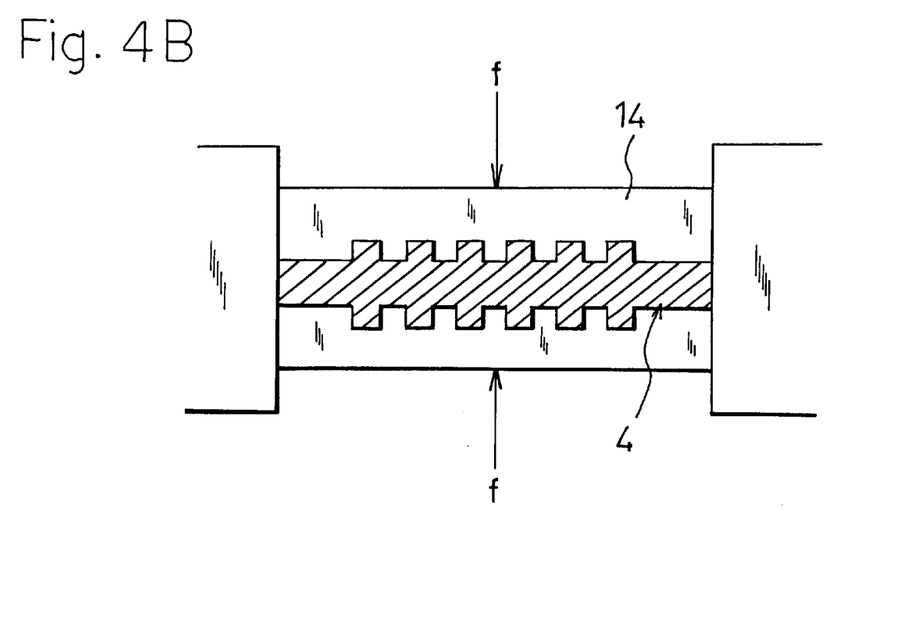
FIG. 4B is a view illustrating the manner of the production.

Each of the separators 4 in the solid polymer electrolyte type fuel cell 20 which is configured and operates as described above is produced in the following manner. A method of producing the separator will be described with reference to FIGS. 4A and 4B. The separator 4 is molded by using a complex (bondcarbon) in which the composition ratios are set to 60 to 90 wt. %, preferably, 70 to 87 wt. % of graphite powder, and 10 to 40 wt. %, preferably, 13 to 30 wt. % of a thermosetting resin. The graphite powder and the thermosetting resin are uniformly mixed with each other and adjusted to produce a predetermined compound (step S100). While applying a pressure in a range of 2 to 10 MPa to the compound, the compound is previously cold-molded into a shape similar to a final molded shape (step S101). As shown in FIG. 4B, the preliminary molded member is then placed in a mold 14 having a predetermined final shape (step S102). Under this state, the mold 14 is heated to 150 to 170° C., and a pressing machine which is not shown is operated to apply a pressure in a range of 10 to 100 MPa, preferably, 20 to 50 MPa in the direction of the arrow f in FIG. 4B (step S103), thereby producing the separator 4 having the final shape which corresponds to the shape of the mold 14 (step S104).

In the separator 4 which is produced as described above, with respect to the composition ratios of the bondcarbon constituting the separator 4, the amount of the thermosetting resin is as small as 10 to 40 wt. % (preferably, 13 to 30 wt. %), and hence the bondcarbon itself has a high conductivity. After the compound of the bondcarbon is preliminary molded into a shape similar to the final molded shape, the preliminary molded member is placed in the mold 14, and a high molding pressure of 10 to 100 MPa (preferably, 20 to 50 MPa) is then applied to the member while heating the mold to 150 to 170° C. Therefore, the thermosetting resin melts and a thermosetting reaction occurs, with the result that the preliminary molded member can be uniformly molded into the separator 4 in which the mold density is high, and which has a predetermined shape.

As the graphite powder which affects the contact resistance at the highest degree, graphite powder in which the average diameter is set to a range of 15 to 125 μm, preferably, 40 to 100 μm is used, and the composition ratio of the thermosetting resin which largely affects fluidity, moldability, and strength is set to a range of 10 to 40 wt. %, preferably, 13 to 30 wt. %. As a result, while the complex serving as a molding material has excellent elongation and fluidity and exerts high moldability, and strength sufficient for preventing the separator from suffering a damage such as a breakage due to vibrations or the like can be ensured, the contact resistance with respect to an electrode can be set to a low value of 10 mΩ·cm² or lower.

Hereinafter, the invention will be described in more detail by way of embodiments.

EMBODIMENTS 1 TO 4

Figure 5:
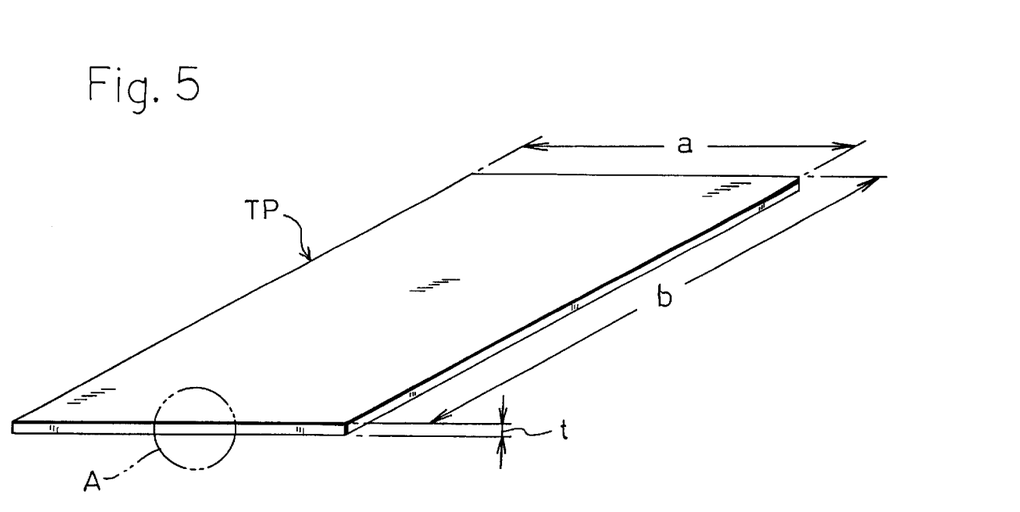
FIG. 5 is a perspective view illustrating specifications of a test piece.
Figure 6:
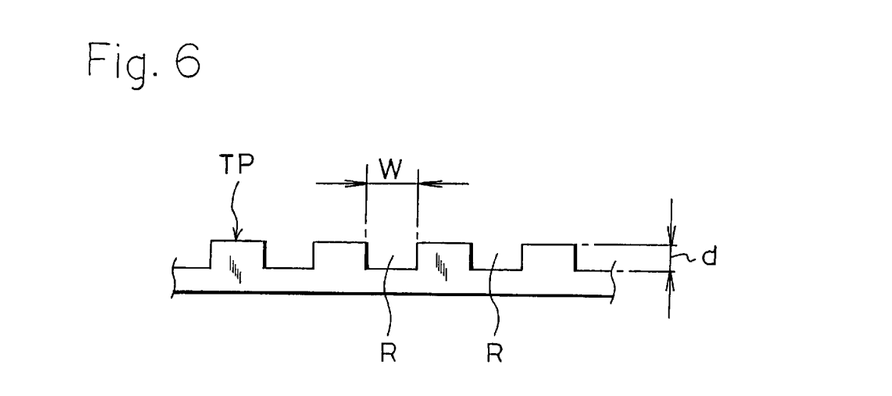
FIG. 6 is an enlarged section view of portion A which is circled in FIG. 5.

Bondcarbon compounds of powders of natural graphite (products of SEC Co. Ltd.) respectively having average particle diameters of 15 μm, 45 μm, 100 μm, and 125 μm, and phenol resin were prepared at the composition ratios listed in Table 1. Each of the compounds was charged into a mold. A molding pressure of 15 MPa was applied to the compound for 2 minutes at a molding temperature of 160° C. Thereafter, the compound was heated to 170° C. for 30 minutes, thereby molding a test piece TP in which, as shown in FIG. 5, width (a)×length (b)×thickness (t) is 170×230×2 (mm), and, as shown in FIG. 6, gas passages R where depth (d)×width (w) is 1×2 (mm) are formed in parallel. In each of the test pieces TP of Embodiments 1 to 4, the surface roughness (Ra) was measured at arbitrary 10 points by a surface roughness meter having a probe of a diameter of 5 μm, and in accordance with the method specified in JIS B 0601-1994. The results are in the ranges listed in Table 1.

COMPARISON EXAMPLES 1 TO 6

Bondcarbon compounds of powders of natural graphite (products of SEC Co. Ltd.) respectively having average particle diameters of 10 μm, 15 μm, 45 μm, 100 μm, and 125 μm, and 150 μm, listed in Table 1. The compounds were molded in the same molding conditions as Embodiments 1 to 4, into test pieces TP of the shapes shown in FIGS. 5 and 6. In each of the test pieces TP of Comparison examples 1 to 6, the surface roughness (Ra) was measured in the same manner as described above. The results a re in the ranges listed in Table 1.

The contact resistance of each of the test pieces TP of Embodiments 1 to 4 and Comparison examples 1 to 6 was measured. The results are listed in Table 1. In each of the test pieces TP of Embodiments 1, 3, and 4 and Comparison examples 1 and 6, the compressive strength was measured, and the results shown in FIG. 7 were obtained. In each pair of test pieces TP which are equal to each other in average diameter of graphite powder, namely, Embodiment 1 and Comparison example 2 (15 μm), Embodiment 3 and Comparison example 4 (100 μm), and Embodiment 4 and Comparison example 5 (125 μm), the compressive strengths are substantially equal to each other.

In each of Embodiments 1 to 4 and Comparison examples 1 and 6, ten test pieces TP were molded. A vibration test was conducted so that vibrations of 1,200 cycles/minute and an amplitude of 16 μm were applied to the test pieces TP. After the vibration test, the appearance of each test piece TP was observed, and the number of non-defective test pieces in which breakage or crack is not produced in, for example, edges of projections for forming the gas passages was counted. The results are listed in Table 2.

TABLE 1

| | AVERAGE PARTICLE DIAMETER OF GRAPHITE POWDER | RESIN CONTENT (VOL. %) | | | | | SURFACE ROUGHNESS Ra (μm) |
|---|---|---|---|---|---|---|---|
| | | 10 | 15 | 30 | 40 | 50 | |
| | | CONTACT RESISTANCE (mΩ · cm²) | | | | | |
| EMBODIMENT 1 | 15μm | 7.9 | 8.4 | 8.8 | 9.1 | 14.6 | 0.1~0.5 |
| EMBODIMENT 2 | 45μm | 4.7 | 5.1 | 5.6 | 6.4 | 12.6 | 0.1~0.5 |
| EMBODIMENT 3 | 100μm | 3.1 | 3.2 | 3.8 | 5.6 | 12.1 | 0.1~0.5 |
| EMBODIMENT 4 | 125μm | 2.8 | 3.0 | 4.6 | 5.3 | 11.9 | 0.1~0.5 |
| COMPARISON EXAMPLE 1 | 10μm | 16 | 32 | 39 | 43 | 60 | 1.2~1.9 |
| COMPARISON EXAMPLE 2 | 15μm | 8.7 | 9.2 | 9.6 | 9.9 | 17.6 | 0.9~1.8 |
| COMPARISON EXAMPLE 3 | 45μm | 6.9 | 7.2 | 7.4 | 7.8 | 14.8 | 0.8~2.1 |
| COMPARISON EXAMPLE 4 | 100μm | 4.6 | 5.6 | 6.7 | 8.9 | 13.2 | 0.8~1.7 |
| COMPARISON EXAMPLE 5 | 125μm | 3.1 | 3.4 | 5.8 | 7.5 | 14.2 | 1.2~1.8 |
| COMPARISON EXAMPLE 6 | 150μm | 2.6 | 2.8 | 3.9 | 5.0 | 13.2 | 1.2~1.8 |

TABLE 2

| | AVERAGE PARTICLE DIAMETER OF GRAPHITE POWDER | RESIN CONTENT (VOL. %) | | | | |
|---|---|---|---|---|---|---|
| | | 10 | 15 | 30 | 40 | 50 |
| | | NUMBER OF NON-DEFECTIVE ONES OF 10 TEST PIECES | | | | |
| EMBODIMENT 1 | 15 μm | 7 | 10 | 10 | 10 | 10 |
| EMBODIMENT 2 | 45 μm | 6 | 10 | 10 | 10 | 10 |
| EMBODIMENT 3 | 100 μm | 7 | 10 | 10 | 10 | 10 |
| EMBODIMENT 4 | 125 μm | 7 | 10 | 10 | 10 | 10 |
| COMPARISON EXAMPLE 1 | 10 μm | 6 | 8 | 8 | 10 | 10 |
| COMPARISON EXAMPLE 6 | 150 μm | 7 | 7 | 8 | 8 | 7 |

As apparent from the results listed in Table 1, in Comparison example 1 in which the average particle diameter of graphite powder is smaller than 10 μm, the contact resistance is not lower than 15 mΩ·cm² even when the resin content is adjusted to any value, or namely is very different from the value (10 mΩ·cm² or lower) which is required in a separator for a fuel cell. By contrast, in Embodiments 1 to 4 and Comparison examples 2 to 5 in which the average particle diameter of graphite powder is 15 to 125 μm, when the resin content is set to a range of 10 to 40 wt. %, the contact resistance can be set so as not to be higher than 10 mΩ·cm², but, when the resin content is set to 50 wt. %, the contact resistance is 11 mΩ·cm² or higher, or cannot be set to be lower than the required value. Furthermore, it was confirmed that, even in the case where the average diameter of graphite powder is in a range of 15 to 125 μm and the resin content is in a range of 10 to 40 wt. %, in Comparison examples 2 to 5 in which the surface roughness Ra is 0.6 μm or more, the contact resistance is higher by 0.8 to 2.23 mΩ·cm² than Embodiments 1 to 4 in which the surface roughness Ra is in a range of 0.1 to 0.5 μm.

Figure 7:
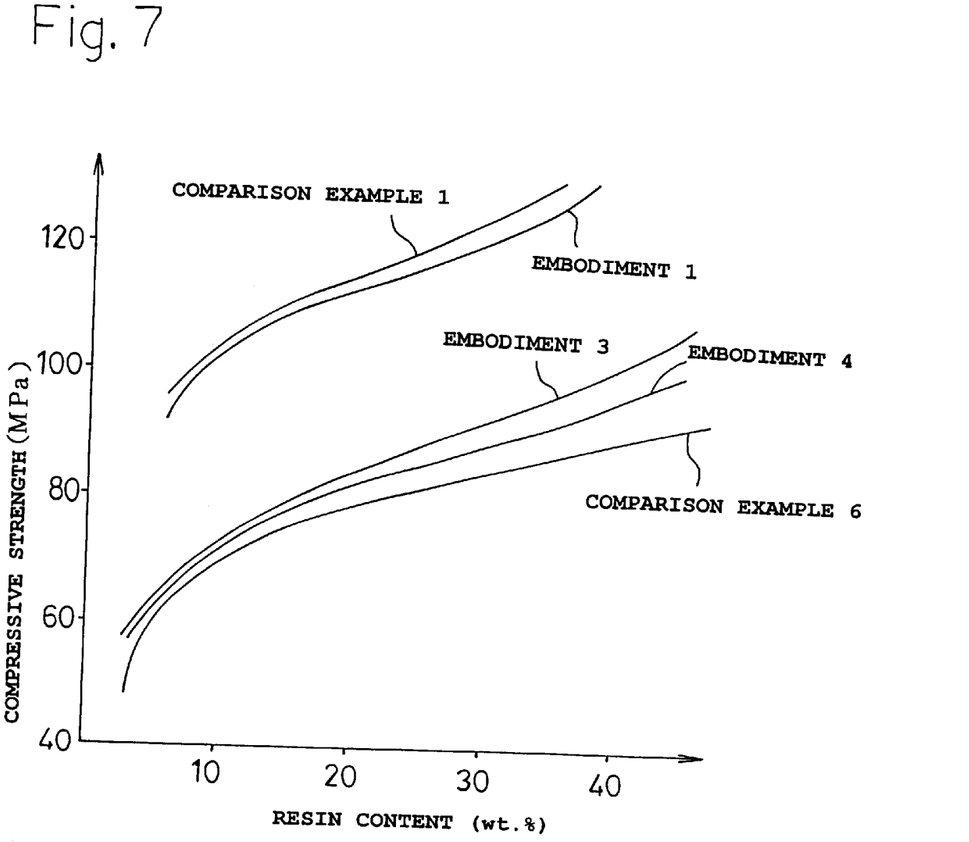
FIG. 7 is a graph showing correlation between the resin content and the compressive strength of embodiments and comparison examples.

As seen from the results of FIG. 7 and Table 2, it was confirmed that Comparison example 1 in which the resin content is smaller than 10 wt. %, and Comparison example 6 in which the average diameter of graphite powder is 150 μm are defective test pieces wherein minute breakages or cracks are produced in edges of projections for forming the gas passages.

From the results of the tests, it was finally noted that the conditions for: attaining a low contact resistance (10 mΩ·cm² or lower) which is required in a separator for a fuel cell; and, even in a use under conditions where vibrations are applied, such as the case of mounting on an automobile, preventing breakages, cracks, or the like from occurring, and maintaining an initial low contact resistance are that the resin content is in a range of 10 to 40 wt. %, preferably, 13 to 30 wt. % and the average diameter of graphite powder is in a range of 15 to 125 μm, preferably, 40 to 100 μm. When the average diameter of graphite powder is set to a range of 40 to 100 μm and the surface roughness Ra of a portion contacting with an electrode is set to a range of 0.1 to 0.5 μm, the contact resistance can be further lowered, so that more improvement of the performance of a cell can be attained.

The entire disclosure of Japanese Patent Application No. 2000-183236 filed on Jun. 19, 2000 including specification, claims, drawings and summary are incorporated herein by reference in its entirety.

What is claimed is:

1. A separator for a fuel cell consisting of a complex which is configured by bonding graphite powder and a thermosetting resin to form the separator, with ribs having a predetermined shape being formed on a surface of the separator, wherein
   a composition ratio of said graphite power in said complex is set to 60 to 90 wt. %, and a composition ratio of said thermosetting resin in said complex is set to 10 to 40 wt. % of said complex;
   an average particle diameter of said graphite powder is set to a range of 15 to 125 μm, and
   each rib is provided with an end portion contacting an electrode, and a surface roughness of at least the end portion is set to a range of Ra=0.1 to 0.5 μm as measured by a surface roughness meter having a probe of a diameter of 5 μm.

2. A separator for a fuel cell according to claim 1, wherein, in said complex, the composition ratio of said graphite powder is set to 70 to 87 wt. %, and the composition ratio of said thermosetting resin is set to 13 to 30 wt. %.

3. A separator for a fuel cell according to claim 2, wherein the average particle diameter of said graphite powder is set to a range of 40 to 100 μm.

4. A separator for a fuel cell according to claim 1, wherein the average particle diameter of said graphite powder is set to a range of 40 to 100 μm.

5. A method of producing a separator for a fuel cell configured by molding a complex of graphite powder and thermosetting resin in which composition the ratios of graphite powder to thermosetting resin are set to 60 to 90 wt. % of graphite powder and 10 to 40 wt. % of a thermosetting resin, and an average particle diameter of said graphite powder is set to a range of 15 to 125 μm, with ribs having a predetermined shape being formed on a surface of the separator, comprising the steps of:
   cold molding said complex into a shape similar to a final molded shape at a pressure of 2 to 10 MPA forming thereby a preliminary molded member;
   placing said preliminary molded member in a mold, to mold it into a final shape by applying a pressure of 10 to 100 MPa; and
   setting a surface roughness of at least an end portion of each rib of said final molding member, which contacts an electrode, to a range of Ra=0.1 to 0.5 μm as measured by a surface roughness meter having a probe of a diameter of 5 μm.

6. A method of producing a separator for a fuel cell according to claim 5, wherein, in said complex, a composition ratio of said graphite powder is set to 70 to 87 wt. %, and a composition ratio of said thermosetting resin is set to 13 to 30 wt. %, and the average particle diameter of said graphite powder is set to a range of 40 to 100 μm.

* * * * *